Nov. 17, 1925.　　　　　　　　　　　　　　　　　　　1,562,325
P. HALLOT
METHOD AND DEVICE FOR BRAKING RAILWAY AND OTHER VEHICLES
Filed May 4, 1922　　　13 Sheets-Sheet 1
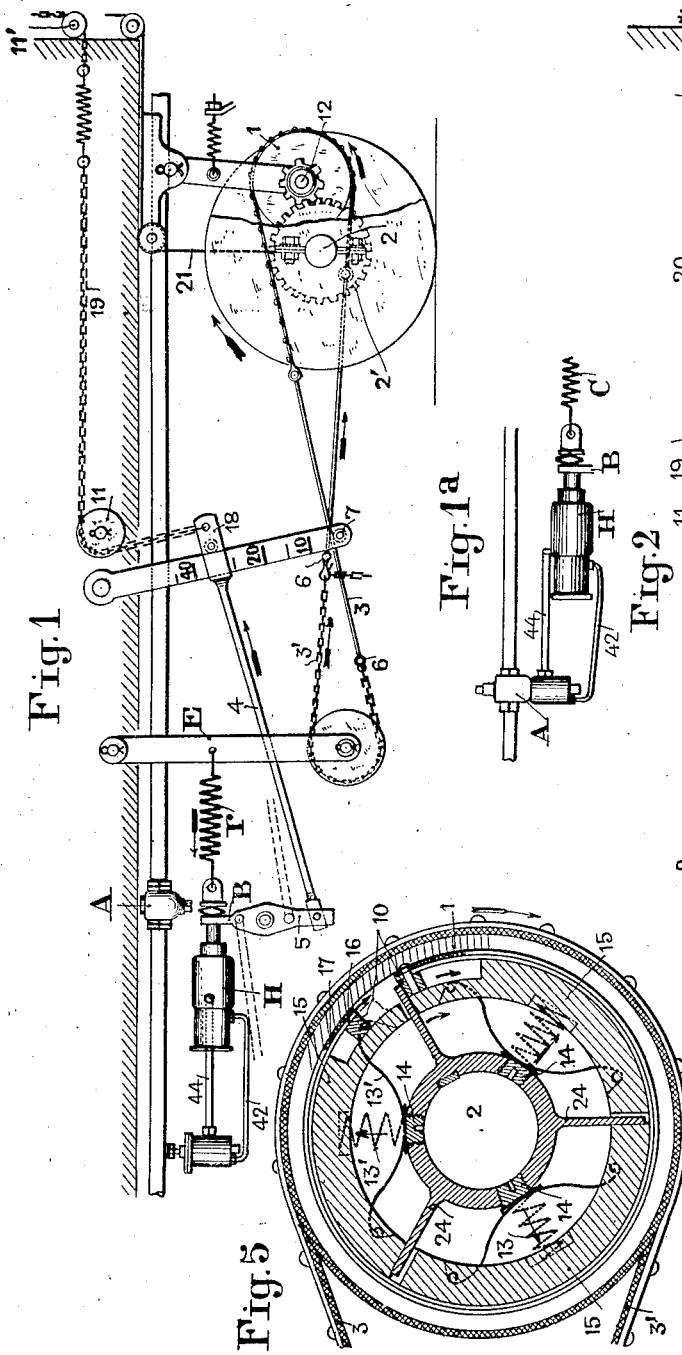
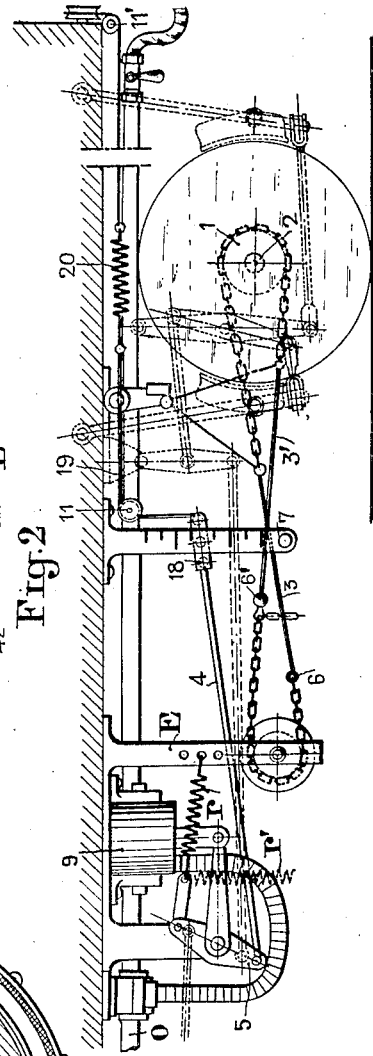
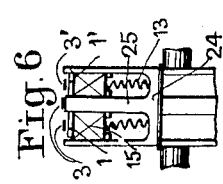
INVENTOR
Paul Hallot
BY
ATTORNEYS

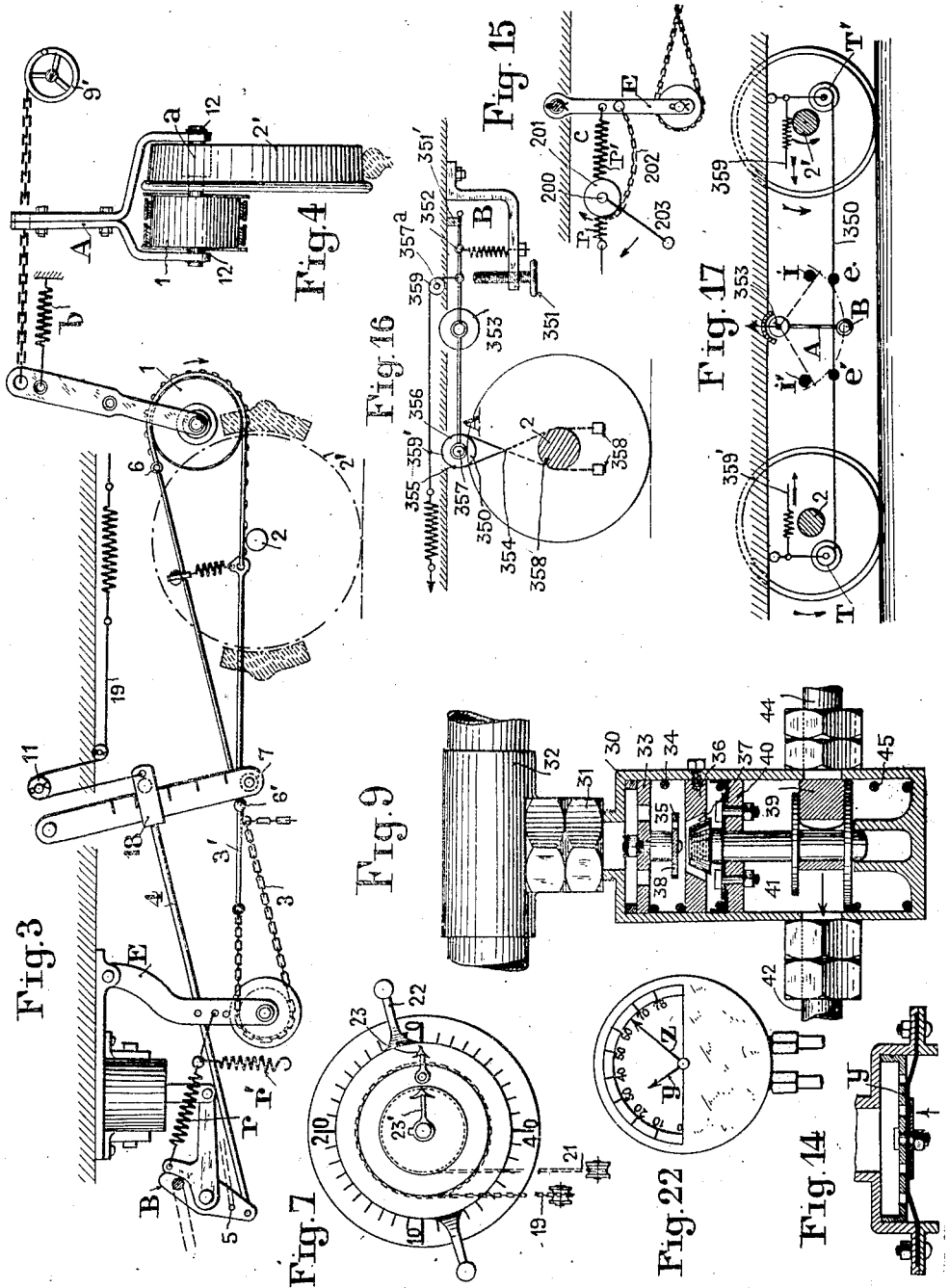

Nov. 17, 1925.  
P. HALLOT  
1,562,325  
METHOD AND DEVICE FOR BRAKING RAILWAY AND OTHER VEHICLES  
Filed May 4, 1922  
13 Sheets-Sheet 3
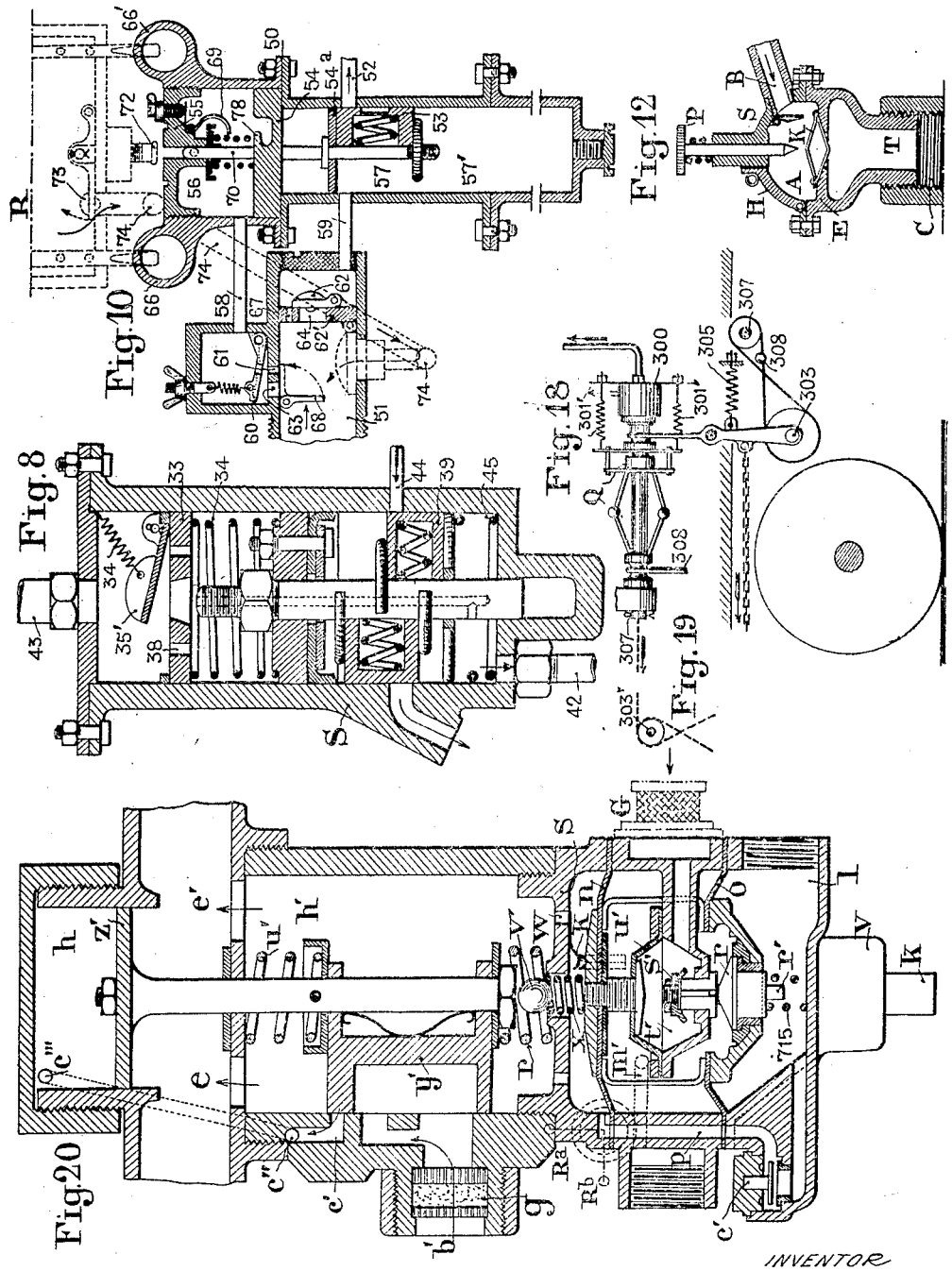
INVENTOR  
Paul Hallot  
BY  
ATTORNEYS

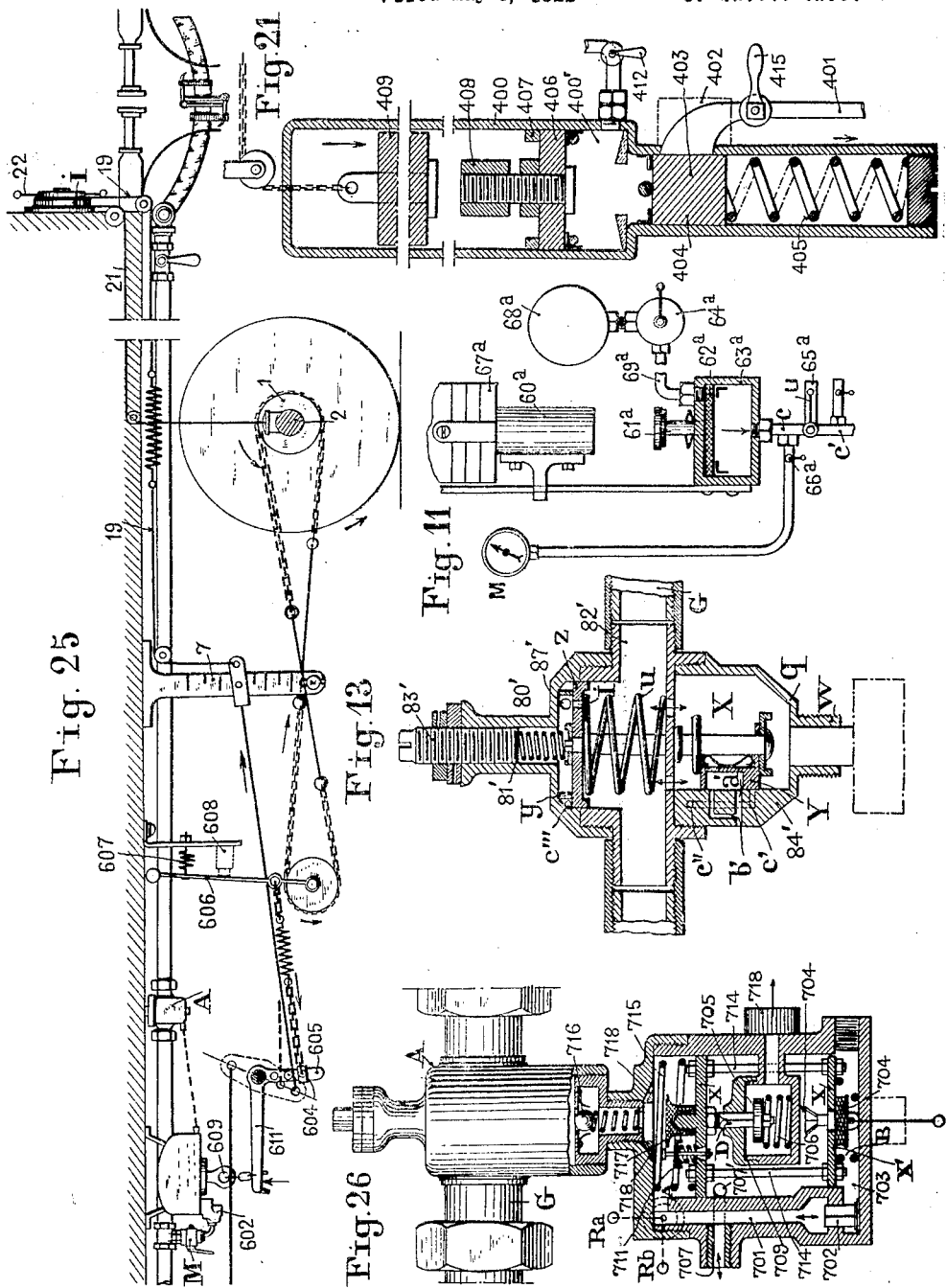

Nov. 17, 1925.
P. HALLOT
1,562,325
METHOD AND DEVICE FOR BRAKING RAILWAY AND OTHER VEHICLES
Filed May 4, 1922 13 Sheets-Sheet 5
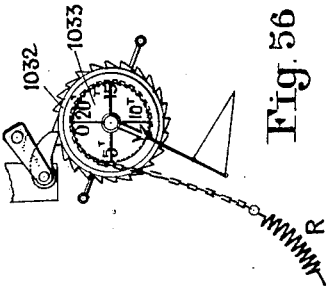
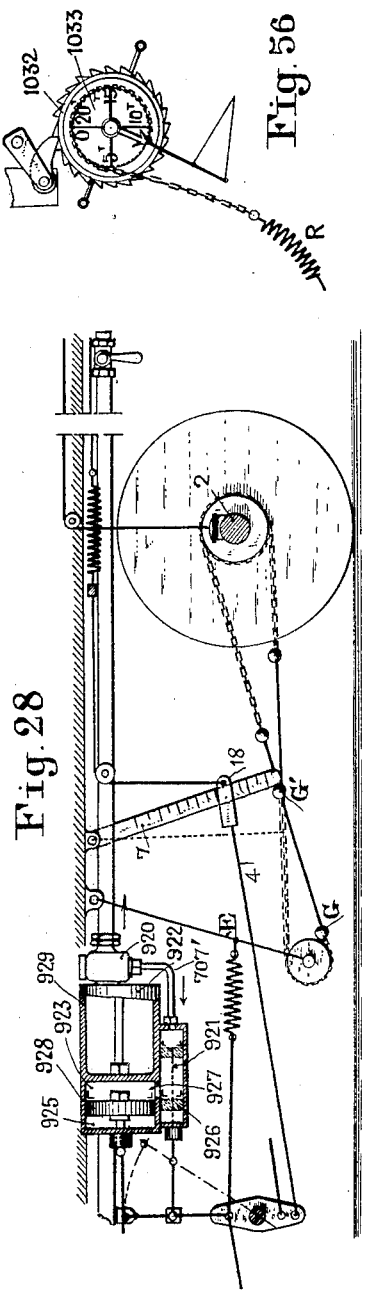
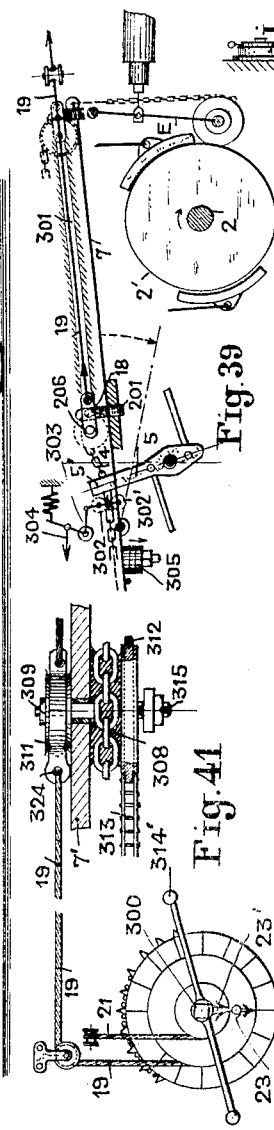
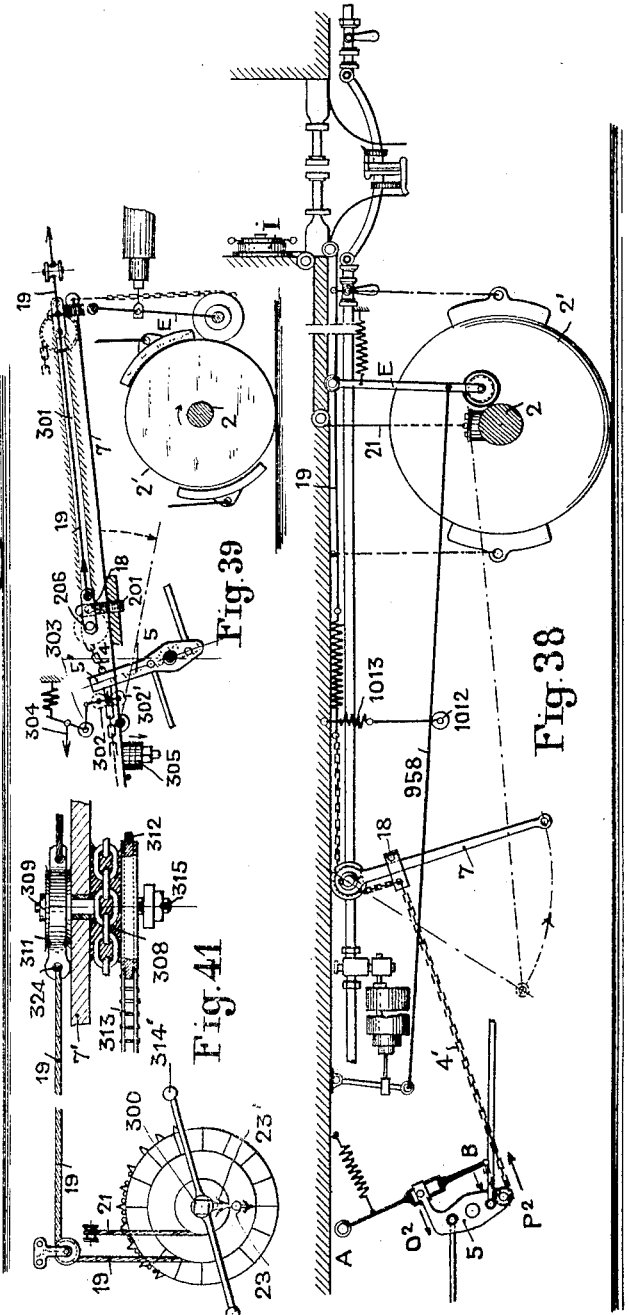
INVENTOR
Paul Hallot
BY Munn & Co
ATTORNEYS

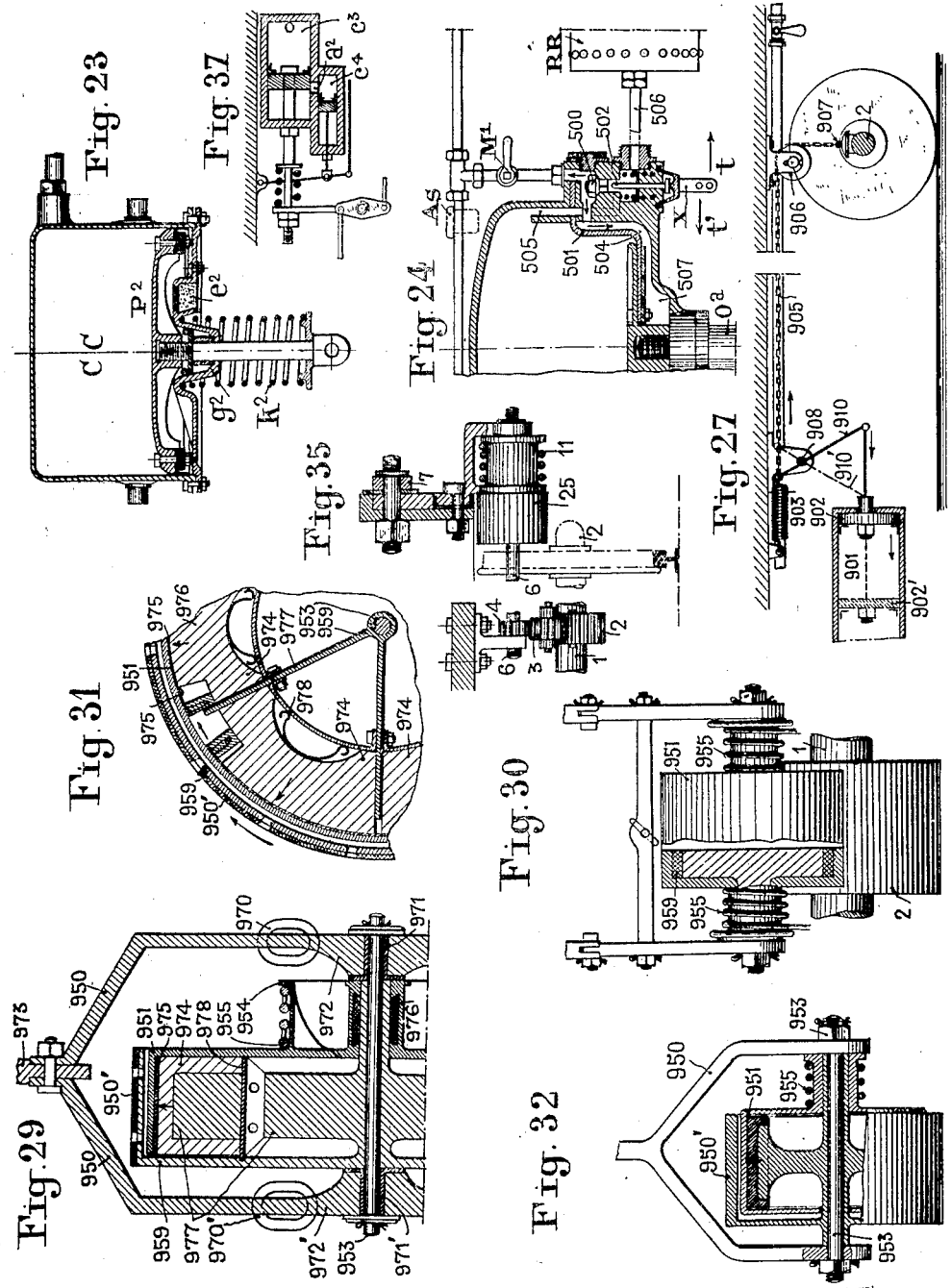

Nov. 17, 1925.
P. HALLOT
1,562,325
METHOD AND DEVICE FOR BRAKING RAILWAY AND OTHER VEHICLES
Filed May 4, 1922 13 Sheets-Sheet 7
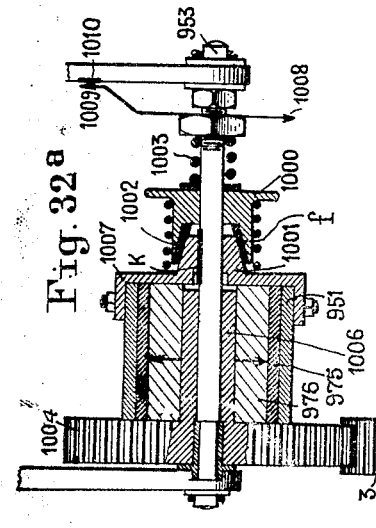
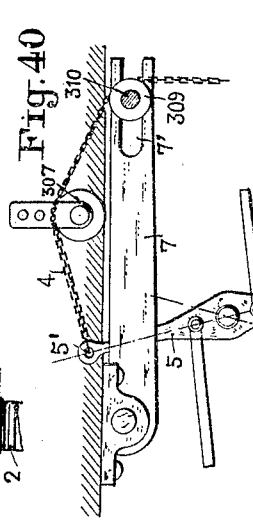
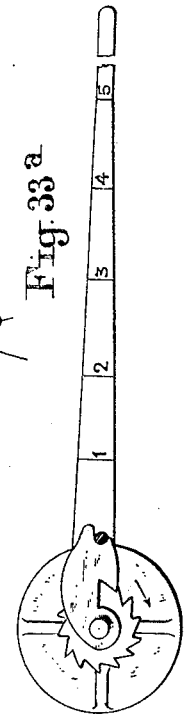
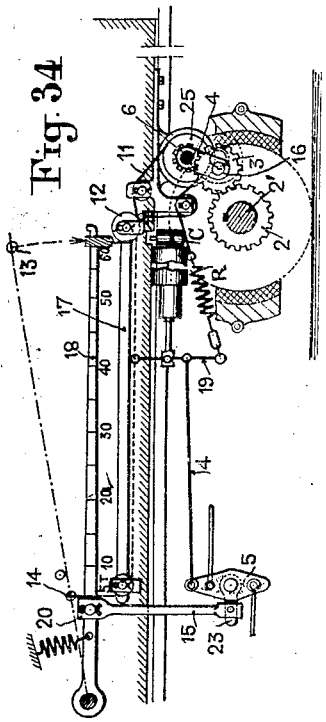
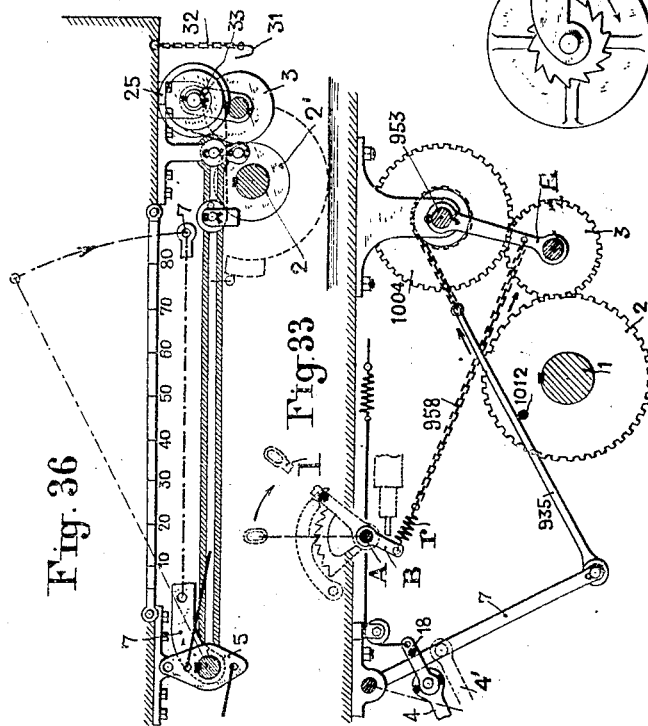
INVENTOR
Paul Hallot
BY Munn Co.
ATTORNEYS Nov. 17, 1925.  
P. HALLOT  
1,562,325  
METHOD AND DEVICE FOR BRAKING RAILWAY AND OTHER VEHICLES  
Filed May 4, 1922  
13 Sheets-Sheet 8
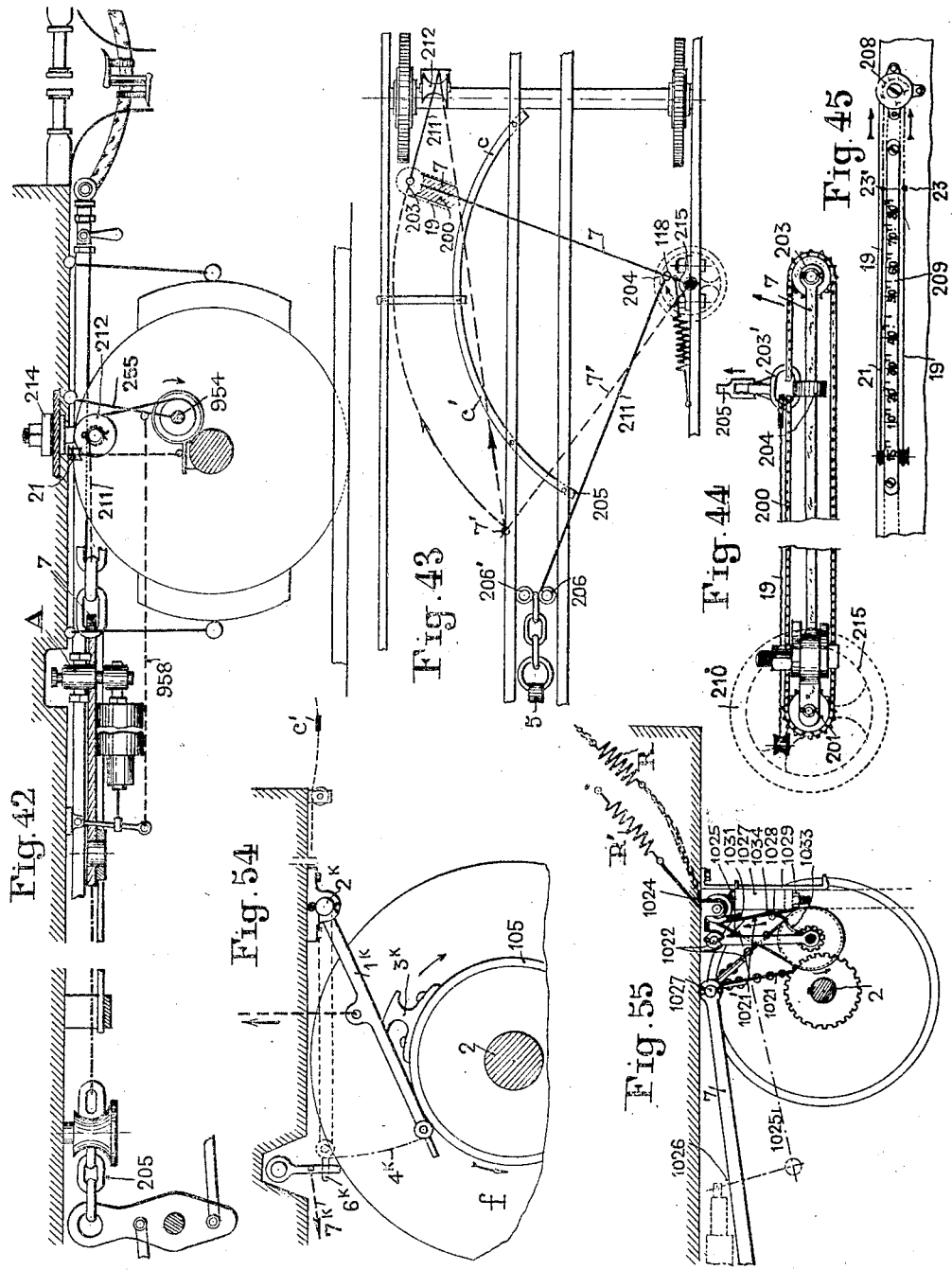
INVENTOR  
Paul Hallot  
BY  
ATTORNEYS

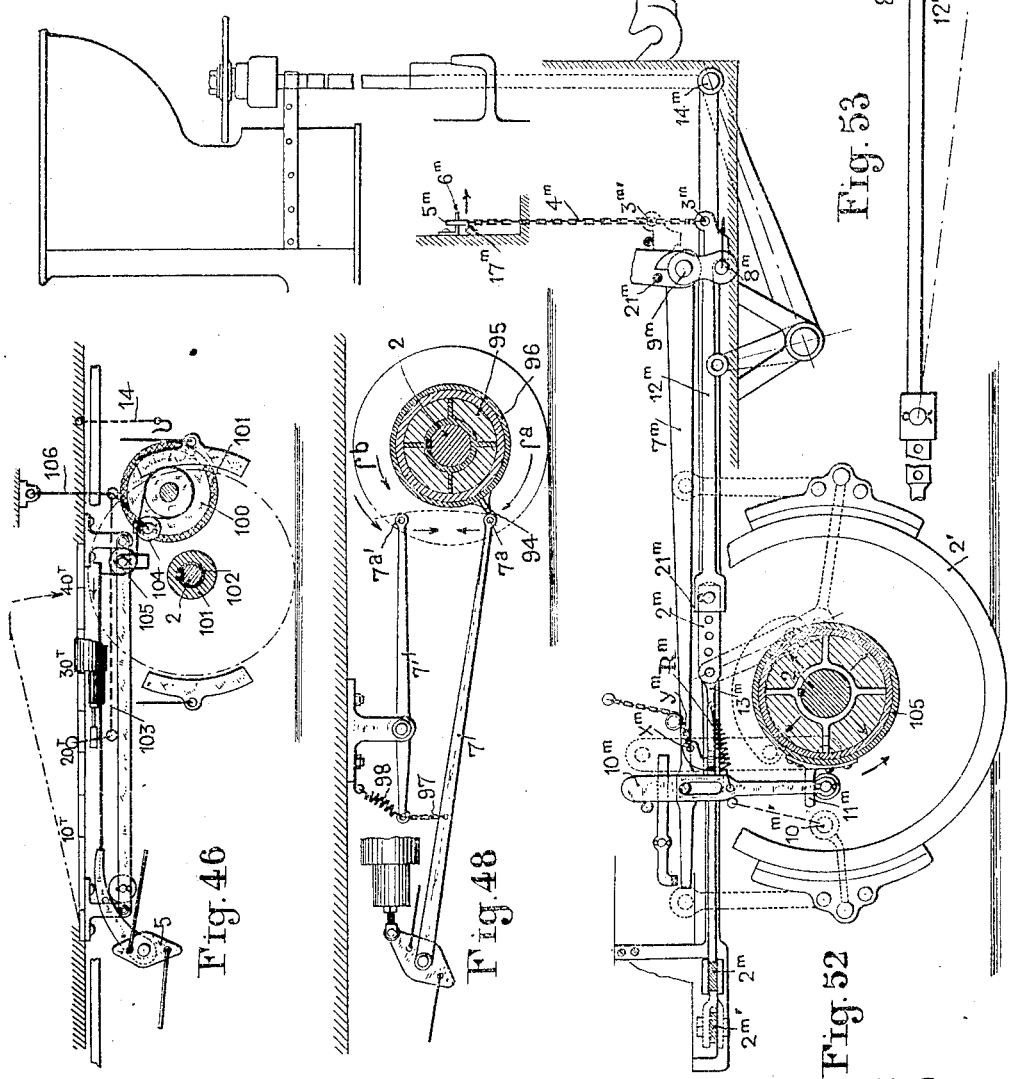

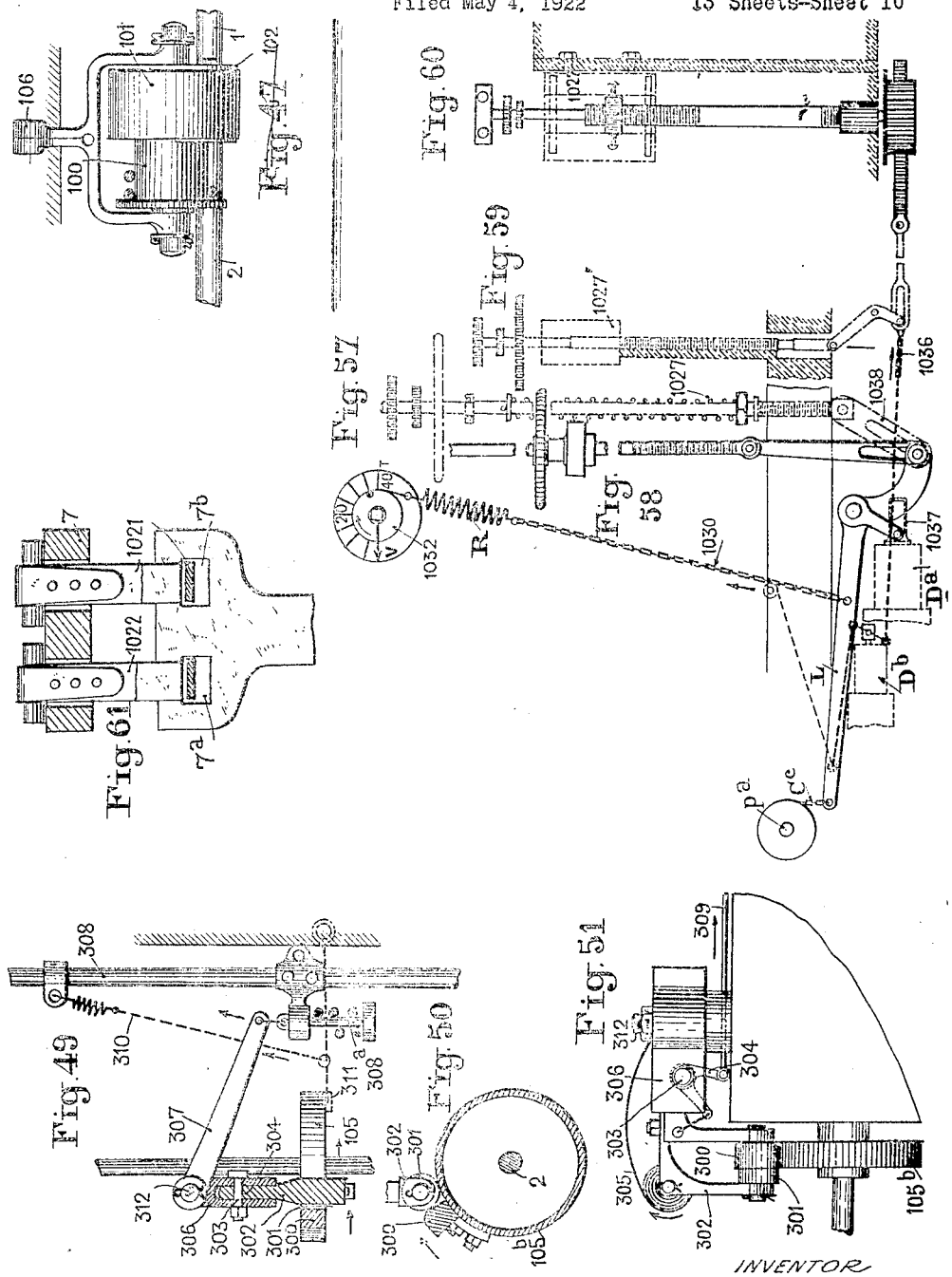

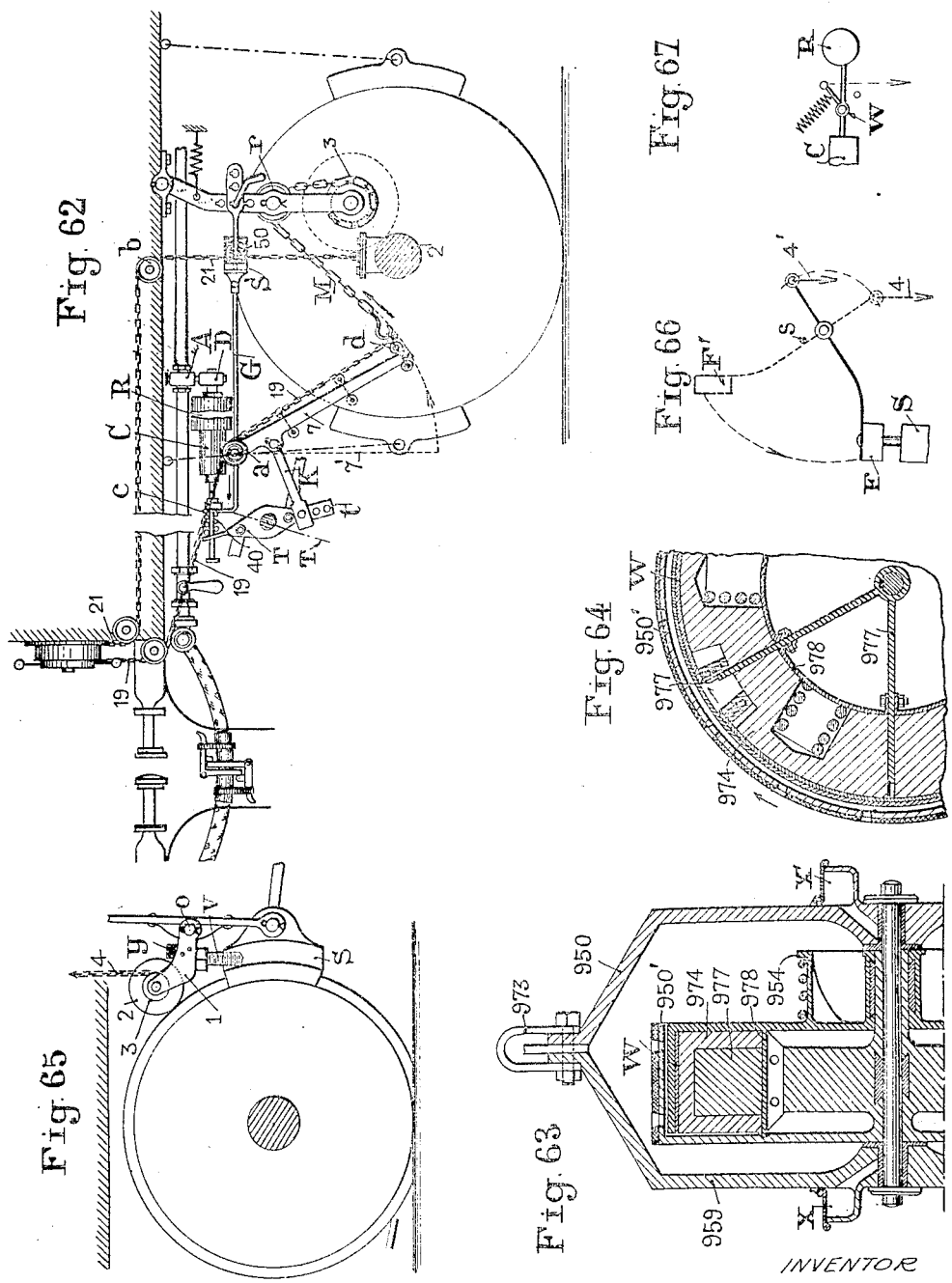

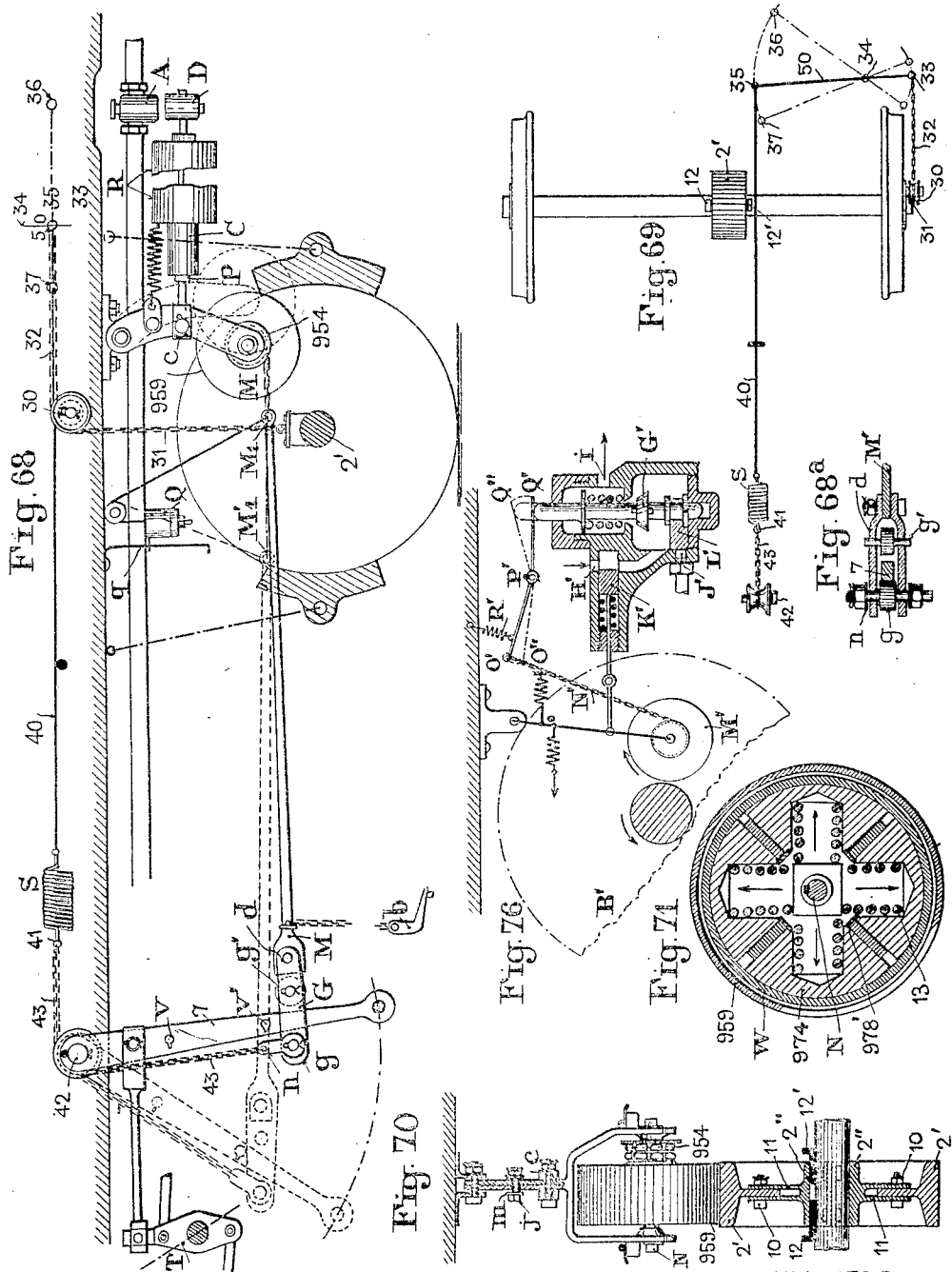

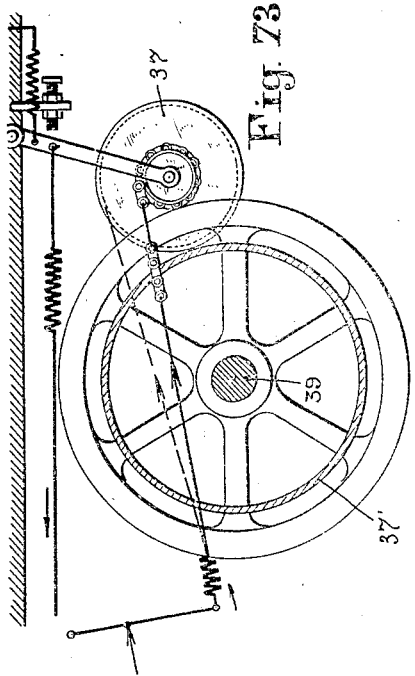
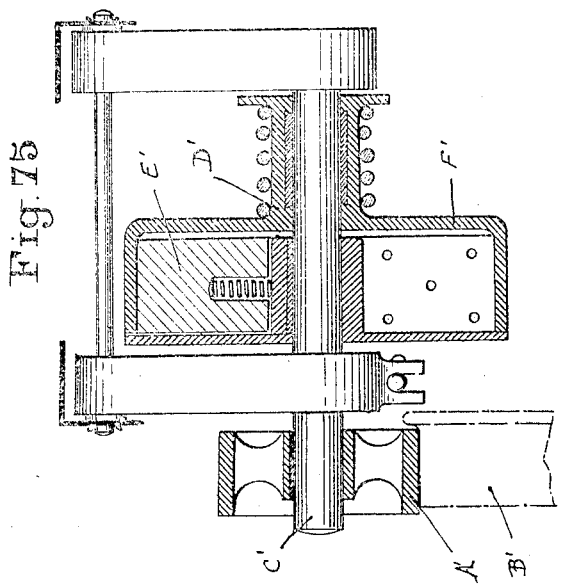
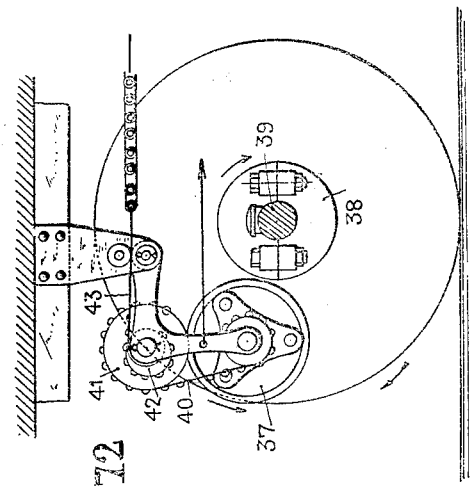
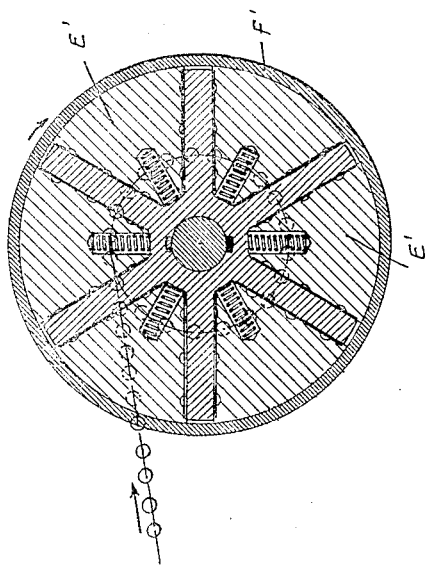

Patented Nov. 17, 1925.

1,562,325

UNITED STATES PATENT OFFICE.

PAUL HALLOT, OF PARIS, FRANCE.

METHOD AND DEVICE FOR BRAKING RAILWAY AND OTHER VEHICLES.

Application filed May 4, 1922. Serial No. 558,415.

*To all whom it may concern:*

Be it known that I, PAUL HALLOT, a citizen of the French Republic, and residing in Paris, France, 15 Rue du Plelo, have invented certain new and useful Improvements in and Relating to Methods and Devices for Braking Railway and Other Vehicles, of which the following is a complete specification.

This invention relates to the braking of vehicles, as well on railway as road vehicles which may be propelled by any motive power, and has more particularly in view to better secure the continuous controlling of the railway brakes, more particularly in long trains.

With that object in view, the invention may use all the usual controlling arrangements which are provided on the railway vehicles, the same being however improved in order to obtain an instantaneous and simultaneous throwing of all the brakes, the same being constantly regulated according to the load of every carriage, in order to secure stopping in a minimum of time, while increasing the security of operation and the regulation of travelling of the train on slopes, the said braking action taking place uniformly and progressively, as well during the tightening as for the releasing action, while the jamming of wheels is avoided. This is due to the fact that a very high pressure is exerted upon the braking shoes in the beginning of the braking action, the said action being automatically reduced together with the reduction of speed of the wheels. Any disturbing actions are also prevented by the action of a rear valve, which is controlled by a compressive shock wave.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view partly in section of the braking arrangement adapted to be applied to any type of carriage having compressed air or vacuum brakes.

Figure 1ª is a fragmentary view of the connected chambers of an air brake system.

Figure 2 is a side view partly in section of a modified form of an arrangement for controlling the braking of long trains.

Figure 3 is an enlarged fragmentary view of the controlling arrangement shown in Figure 1.

Figure 4 is a rear view of a car wheel and operating winch for the braking mechanism.

Figure 5 is a vertical section of a combined drum and winch adapted to be employed in connection with the device shown in Figure 1.

Figure 6 is a radial vertical sectional view of the drum and winch shown in Figure 5.

Figure 7 is a plan view of a controlling hand wheel which, through its action, effectually varies the exhaust of the compressed air.

Figure 8 is a vertical section of the exhaust valve.

Figure 9 is a vertical section of a modified form of the exhaust valve shown in Figure 8.

Figure 10 is a vertical section of a three-way valve for compressed air brake systems.

Figure 11 shows more or less diagrammatically a modified form of applying the so-called shock waves.

Figure 12 shows another modified form in which the shock waves are produced by an explosion in the compression chamber.

Figure 13 is a vertical section of an accelerator.

Figure 14 is a fragmentary view in section showing the details of the reinforcing washer used in the accelerator shown in Figure 13.

Figure 15 is a fragmentary side view of the controlling means for the clutch of a self-governing member.

Figures 16, 17 and 18 show the various forms of a governor for regulating the pressure of the brakes.

Figure 19 shows more or less diagrammatically the winch.

Figure 20 is a vertical section of an accelerator for vacuum brakes.

Figure 21 is a vertical section of a device for producing the shock waves in the vacuum pipes of a vacuum braking system.

Figure 22 is an elevation of an indicator for the vacuum system.

Figure 23 is a vertical section of a cylinder and piston operating therein adapted to be employed in connection with the vacuum system for aiding in rapid release in case of an emergency.

Figure 24 shows a modified form of a vacuum having two chambers.

Figure 25 is a side elevation of a modified form of braking means.

Figure 26 is a vertical section of a distributor combining the functions of a depression accelerator supply moderator and distributor.

Figure 27 is a fragmentary side view partly in section of a device for regulating by a variation in the expansion of the cylinder the pull on the brakes.

Figure 28 is a fragmentary side view of a modified form of shoe applying agency.

Figure 29 is a vertical section of a loose pulley for transmitting the centrifugal clutching strain to the shoe lever.

Figure 30 is an end view of the pulley shown in Figure 29.

Figure 31 is a vertical section taken at right angles to the section shown in Figure 29 of the loose pulley.

Figure 32 is an end view of a modified form of the regulating winch.

Figure 32a is an end view partly in section of the device shown in Figure 33.

Figure 33 shows a side view of a modified form of braking device.

Figure 33a shows a side view of a detail of a regulating arm disclosed in Figure 34.

Figure 34 is a side view of a modified form of braking mechanism shown in Figure 33.

Figure 35 is an end view of a detail of the winch shown in Figure 36.

Figure 36 is a longitudinal vertical section taken on a different line from that shown in Figure 34.

Figure 37 is a transverse sectional view of an auxiliary controlling device adapted to be used in connection with the construction shown in Figures 33 to 36 inclusive.

Figure 38 is a modified form of the construction shown in Figure 36 and has a regulating head operable at the end of an auxiliary multiplying lever.

Figure 39 shows a vertical section of another arrangement for the operating lever disclosed in Figures 1 to 3 for multiplying the force of the application of such lever.

Figures 40 and 41 show fragmentary views detailing the modified form of automatic controlling device adapted to be used in conjunction with the regulating device of Figure 7.

Figures 42 and 43 are enlarged detail views of further modified forms showing the horizontal arrangement of the operating lever for the brakes.

Figures 44 and 45 are respectively side and plan views of a device for indicating the degree of the load on the brakes.

Figure 46 is a side view in vertical section of a winch and a controlling member connected to the piston of a fluid pressure cylinder.

Figure 47 shows an end view of the winch shown in Figure 46.

Figure 48 is a modified form of the operating mechanism shown in Figure 46.

Figure 49 is a horizontal section of a modified form of braking means adapted to be applied to a motor vehicle.

Figure 50 is a vertical section taken through a pulley loose on the main drive shaft.

Figure 51 shows an end view of the construction shown in Figure 49.

Figure 52 is a longitudinal vertical section showing a device for reinforcing the action of an end brake of a motor vehicle.

Figure 53 shows more or less diagrammatically the indicator connected with the device shown in Figure 52.

Figure 54 diagrammatically discloses the means for keying the loose pulley disclosed in Figure 49 so that the same will form a friction shoe against a fly wheel or any form of revolving means.

Figure 55 is a side view of the braking device in combination with an indicating mechanism.

Figure 56 shows a visual signal adapted to be brought into view by the indicating means shown in Figure 55.

Figure 57 diagrammatically shows the adaptation of the controlling means to a brake of the specific form known as the Lapeyrie.

Figure 58 shows diagrammatically another arrangement for a screw brake with a direct actuating means.

Figures 59 and 60 show diagrammatically other examples of arrangements for connecting the controlling means of several brakes with self-regulating brakes.

Figure 61 is a horizontal section taken along the line 1021' of Figure 55.

Figure 62 shows a side elevation of a modified form of continuous braking mechanism.

Figure 63 is a vertical section of an operating winch used in Figure 62.

Figure 64 is a vertical section taken at right angles to the section of Figure 63 of the winch.

Figure 65 is a side view showing the winch in operative relation with the brake and wheel of a car.

Figure 66 shows diagrammatically the several positions of one of the shoes of the carriage.

Figure 67 shows an operating means for controlling the valves of the cylinders of the air brakes.

Figure 68 shows a still further modified form of operating mechanism for air brakes and in which the valve is provided with a closing spring and an abutment determining the position of opening said valve when the winch is put into action.

Figure 68ª is a horizontal section showing details of the connecting means between the operating lever and the brake applying device.

Figure 69 shows a fragmentary plan view of the shoe applying device disclosed in Figure 68.

Figure 70 shows diagrammatically a simplified arrangement of the winch operating mechanism disclosed in Figure 68.

Figure 71 is a vertical section of the winch disclosed in Figure 70.

Figure 72 is a further modified form of brake applying device.

Figure 73 is a vertical section of another modified form of the winch and operating parts.

Figure 74 is a vertical section of a loose pulley provided with a rotating mass included within the pulley.

Figure 75 shows a further modified form of the winch and its operating parts disclosed in Figures 72 to 74 inclusive.

Figure 76 is a vertical sectional view of a modified form of operating mechanism for the winch which controls the brakes.

In Figs. 1, 1ª, 2, 3 and 4 which represent arrangements which may be applied to any type of carriage provided with compressed air or vacuum brakes, according to the French Patent 474,518 filed on December 6, 1913, 3—3′ is an endless cable (formed for instance with a chain provided with connecting rods) which is drawn by a servo-multiplying winch 1, and the abutments of which 6 and 6′ displace the lever 7 according to the direction of rotation. The power transmitted by the lever E, either through a regulating lever (not shown on the drawing) or through a spring r (Figs. 2 and 3) is controlled by the existing group of levers, the clutching power being greater if the clearance is more considerable owing to the wear of the braking shoes is more important.

The arrangement shown in Fig. 2 is applicable to carriages already provided with any brake, either compressed air or vacuum brakes (of the Westinghouse or Clayton type, etc.) for enabling the same to efficiently brake the long trains, as complementary means of the usual brakes.

Figs. 5 and 6 show a combined drum and winch 24 of the self governing apparatus 1 which embodies a modification of the arrangement described in the French Patent 474,518 in which while braking the strains transmitted simultaneously to the cables 3—3′ are always less than the strain which would cause a jamming of the wheels. The weight of the masses 15 is such that at high speeds the controlling power they are adding to that of the springs 13, 13′ by their centrifugal pressure and to the action of the multiplying band 16 produces a first strain, called "constant" and reduced to 50% of P, unable to jam the wheels, and a second strain, called "complementary", equal to 50% of P, for instance, which automatically decreases to naught, and the addition of which, consequently is not powerful enough for preventing the rotation of the same.

For regulating the power of the braking action according to the variable load of the carriage axles (Figs. 1, 2, 3, etc.) the connecting rod 4 connected to the braking rods is provided with a head 18 which may be displaced along a regulating lever 7 by means of a cable 19, provided with a spring 20, and passing upon pulleys 11, 11′ for acting, either automatically under the control of the springs, for instance by means of a cable 21 connected to a fixed point such as an axle bearing, or directly by hand, by means of a controlling hand wheel 22 (Fig. 7) with a pointer 23 and convenient graduations, the same being arranged so as to displace, even by a direct action, the regulating head 18 for regulating the position of the same upon the lever 7 according to the flexion of the carrying spring, that is to say of the load.

For the compressed air brakes called "with two chambers" it is possible to make both chambers communicate with each other at the time of unbraking through a connecting pipe 44 (Figs. 1ª, 8 and 9) and by means of the sliding valve 39 of the exhaust valve S. The said valve is provided with a sliding valve 39 which from the beginning of reloading the general piping, simultaneously equalizes in every cylinder the pressures in both chambers in view of the quick and simultaneous releasing of all brakes.

The said releasing accelerator comprises also a supply moderator. It comprises a casing 30, connected with the general piping 32; a regulating block 35, a resisting spring 34, a closing washer, a transom 36, so that, for strong movements of air produced in the general piping both parts of the apparatus are connected together only by the small apertures 38.

For securing a very quick new loading of the general piping, the driver may use the air under a high pressure contained in the tank R, and even a cylinder giving compressing waves or fluid impulses.

In the course of the said operations, the sliding valve 39 (Fig. 8) descends until both chambers of the cylinder have been loaded again at the normal pressure by the communication of the canals 42, 44. At that time, the spring 45 closes again the sliding valve 39 and by such means, the air pressure being deleted, the release, delayed in the front part of the train, is, on the contrary, much accelerated in the rear part of the said train.

Fig. 10 shows a removable three-way valve for compressed air brake, connected at 51 with the general collector C of the rear carriage of the train, in order to enable a quick exhausting of the air, when desired.

The air of the collector 51 may escape at 42 through a sliding valve 53, controlled by a piston provided with two unequal surfaces 54 and 54ª, which separates two chambers 56 and 57, of different volumes, the complementary chamber 57' being removable at will.

The chamber 56 and both connected chambers 57 and 57' are connected with the main pipe 51 through pipes 58 and 59, with interposition of a loaded valve 60 which is provided with a central channel 61, and may close the canal 63 provided in its seating.

The seating 62' of the valve 62 has a large opening 64, and a small canal 67. During the travelling of the train, the air fills in all the chambers and the sliding valve 53 is closed by the differential piston 54 which rests upon the seat 50.

As soon as a sudden excess pressure occurs, coming through 51, the hanging valve 68 applies itself against the orifices 63 and 61, and the pressure, raising the valve 62, acts under the piston 54ª, the sliding valve of which 53 opens the main pipe 51 at the atmosphere at 52, which produces a quick under pressure, which is transmitted from the rear to the front part of the train for cocking all brakes. This escape ceases as soon as the differential piston is caused to descend owing to the fact that the equality of pressure is reestablished in the upper chamber 56.

For a slight depression, the parts are in the position of Fig. 10 the sliding valve 63 being only very little displaced. If, however, the said depression is sudden, the valves 60 and 62 remain applied upon their seats, the canals 63 and 64 are closed, and the depression acts in the chambers 56, 57 and 57' only through the small apertures 61 and 67. The volume of the latter chambers 57 and 57' being however larger than that of 56, the pressure quickly becomes preponderant and the differential piston, raising the sliding valve 53, opens the main pipe to the open air at 52; the valve 62 then opening largely at that time for that purpose, but the driver may still regulate the effects at any time, according to the indications of the pressure gauge of the pipe.

The said valves, in order to permit the use of any removable valve for the quick untightening of the brakes, are arranged under a tank R supplying the main pipe 51 with air through the pipe 74 when an abutment such as 72 will raise the valve 73, as shown in Fig. 10, or in any other way.

When tightening the brakes, the compressing wave does not permit the spindle 70 to raise the said abutment 72, at the untightening, however the pressure in the chamber 56 being very reduced, the piston 54 may go on with its raising movement for acting upon the abutment 72, thus closing the sliding valve 53 and keeping the valve 73 raised, the projection 78 being hooked in a stopping part 69.

The first application of the shoes is made by sending a compressing or so called "shock wave", which the driver suddenly provokes in the main pipe C by any convenient means. The said wave quickly is propagated towards the rear part of the main pipe, which is thus opened to the atmosphere by a valve so called "three way" provided for that purpose. It results in a very quick depression of the main pipe; but the value of the braking pressure is maintained at the convenient value by the driver by means of a convenient manœuvring of his valve. It is then possible to obtain all the desired effects of moderability.

The said wave could be sent by means of a block 60ª, hanging at a convenient height (Fig. 11) and which the driver will let fall upon the abutment 61ª provided at the end of a compressing piston 62ª, located in a cylinder 63ª for the communication with the main pipe C.

A special cock 64ª may admit high pressure air from a particular tank 68ª for a supplementary feeding of the cylinder 63ª in order to increase the speed of propagation of the said wave through the pipe 69ª, or for maintaining its action by acting above the piston 62ª. The same effects of propagation may be applied to the vacuum brakes, by using a very strong depressive wave obtained by any means.

Fig. 12 shows a modification which comprises: an explosion and compression chamber A in which a capsule K filled with a substance with a quick production of a gas under a shock or a braking, arranged upon an anvil E may be opened by a compressing part P, such as a pin P upon which the mechanism or any automatic member at the passage of a signal of the way. A cap J closes the opening through which air arrives under the effect of compression.

For the application of the self governor to the brakes already in use, the apparatus only receives the spring 13' (Fig. 5) provided for maintaining only the mass 15, the constant strains, reduced to 0.50% of P being in fact provided only by the only pressure fluid brake (Westinghouse, Clayton, etc.) but in some systems, the spring 13 can be simultaneously maintained.

Figs. 13 and 14 are accelerators comprising a piston reinforced by means of a washer $y$ (Fig. 14) for compressing waves pipes, the action of which may be regulated by means of a spring 80' compressed by a screw 83', in combination or not with a cock which may put the upper chamber 81' into communication with a tank, so as to obtain variable masses of air exhausting under every carriage, according to its service.

When travelling, the apparatus is arranged as shown in Fig. 13, the air at a pressure of for instance 5 kg. filling up all the chambers.

For a depression even slight, however, the piston $z$ compresses the spring $u$ and the sliding valve, while descending allows the air from the main pipe to make its escape through $h'$ under every carriage, thus producing a very quick acceleration; at the same time, however, the very small canal $c'$, $c''$, $c'''$ allows the air from the upper chamber 81' to escape itself and to be brought, more or less quickly, according to the volume of the special tank, to a pressure near that of the main pipe. The spring $u$, in fact, very quickly resumes its preponderant action for bringing back all the parts into the travelling position. The piston $z$ being fitted with a slight clearance, the pressure slowly attains the same value upon both faces of the piston, should even the small orifice 4 be obstructed.

Fig. 15 shows a controlling means for the clutching of the self governing member, which may be actuated on either side of the carriage, and which comprises a cross shaft 200 carrying a small pulley 201 with a small chain 202 connected with the lever 203, and at each end of the shaft, a controlling lever 203 of the said shaft, which may be provided with hand wheels with any apparent marks (not shown).

Figs. 16, 17 and 18 show a regulator which uses the turning action of the rotating masses for regulating the pressure of the brakes, and particularly the reduction or the ceasing of the said rotation, for temporarily opening a reducing valve, as soon as one of the carriage axles is brought to rest, and thus avoid any jamming of the wheels.

In Fig. 16, the said regulator comprises a reducing valve 303, a lever AB, with a valve opening spring 352, which acts as soon as the axle ceases rotating, but the action of which is annihilated by the cable 359' when the shoes have not been applied, a pulley 350 connected at A with the endless cable 354, two controlling abutments 355, 356 which are stopped at 357 according to the rotation of the axle acting upon one end or the other, and the action of which maintains the lever applied against the abutment 351' (valve closed).

The said cable is provided with a clutching weight 358. A regulating screw 351 and an abutment 351' limit the opening of the valve 353. The return spring of the shoe levers may be used for constantly maintaining the lever raised at AB, out of action (pulley 357 and cable 359). The ends of the cable may be connected with two small winches T, T' in mesh with the axle at the time of braking only (Fig. 17).

Should a jamming of the wheels occur, the axle which becomes the last jammed will produce a temporary displacement of the lever, which will cause a large exhaust of the air, thus letting the translation to be operated with the full speed, and, if necessary, new successive regulations will take place in the same manner, should jamming take place anew.

In Fig. 18, 300 is a cylinder with an exhaust sliding valve or any other member, connected with the pressure chamber of the brake, so that a constant strength (for instance a spring) permanently tends to reduce the braking pressure when a centrifugal antagonist action (centrifugal friction blocks, watt governor, etc.) does not oppose it.

The said governor may be controlled by the rotation of one of the axles of the carriage, by means of the pulleys 303' applied against the tyre by a winch 303'' (Fig. 19) which is put in action only at the time of the braking (connecting rod of the shoes, etc.) in spite of the antagonism of a spring 305. The latter also opposes, by acting upon the arresting lever or fork 306 to the action of the spring 301' which, through the pin Q, control the exhaust valve as soon as the wheel reduces its rotation speed at the beginning of the jamming. The centrifugal strain being no longer preponderant, the air in fact escapes by the play of the governing member under the action of the springs 301', and a reduction of the braking action takes place until the said reduction allows the wheel to resume the rotation, alternative actions which thus continue automatically to the time of stopping.

Fig. 20 is the necessary accelerator for the vacuum brakes. The sliding valve $v'$ allows the air to come back through the canal $h'$ into the lower chamber $b'$ which corresponds with the main pipe C through the orifices $e$, $e'$ and the pipe $c'$ which receives the air through the sliding valve, little by little reestablish at $b$, above the piston, the pressure balance. The spring $u'$ may then close again the slide valve $y'$ a displacement stopped by the spring $x$, the coils of which keep on obturating ball $v'$ the duty of which is to shut the central canal by compressing the coiled spring $x$, and thus deleting the action of the front distributors, in the case of sending compressing waves, the small orifices $w$ only allowing a slow reloading. G is a dust filter. The said apparatus may be connected with a distributor (Fig. 20).

This distributor comprises two diaphragms $n$, $o$ which are reinforced, contituting two chambers $k$, $l$, respectively connected with the main pipe and with the vacuum tank, and, with each other, by a pipe $o$ in which a valve $q'$ allows the air to pass only in one direction.

The chamber $m'$ of the cylinder is connected with the chamber $l$ by the valve $r$, and with the atmosphere by a valve $s'$ located in the lower wall of a pocket $t'$ provided in its central part. The upper part of the said pocket has a diaphragm $u'$ connected with the diaphragm $n$. The valve $r$ which closes the said pocket is provided at its lower end with a tail $r'$ which raises the same from its seat, by abutting against the bottom of the casing when the movable system of diaphragms is lowered.

When the vacuum exists (as in the figure) both diaphragms are drawn towards the top: valve $r$ raises the tail of the valve $s'$, while remaining upon its own seat, which completely insulates the chamber $l$ from the brake cylinder $m'$ thus brought into communication with the atmosphere by the valve $s'$. On another hand, the valve $s'$ is opened and the vacuum is propagated into the tank $l$.

Should an admission of air take place in the general piping for the purpose of braking, this pressure closes the valve $q'$ and lowers the diaphragms. The valve $s'$ is closed, the valve $r$ being kept open by the abutting of its tail against the bottom of the casing. The vacuum may then be propagated from the vacuum tank to the brake cylinder, which causes a full tightening of the brakes. For reducing the said tightening, a slight admission of air is caused to take place. Then, the group of diaphragms directly descends, the valve $r$ is opened and, when the balance of air is anew obtained between the brake cylinder and the tank, the valve $r$ is progressively closed, and it is thus possible, by successive steps, to obtain all braking actions in great moderation. In fact, if the tightening is too strong, the air is drawn from the main pipe, which causes the system of diaphragms to be raised; the valve $r$ then is closed and its head raises the valve $s'$. An admission of air will then take place in the chamber $m'$ and the tightening will be reduced in a corresponding way; owing to the said stronger pressure, however, the diaphragm $u$ will make the movable system descend and thus allow the valve $s'$ to be brought again upon its seat. By thus manœuvring the ejector at variable degrees, it will be possible to maintain all degrees of tightening on long slopes.

The bottom of the distributor is provided with a special packing V, carrying a central rod which it is sufficient to bring back completely for causing the opening of the valve $s'$ and consequently to instantly provoke the untightening of the brake.

Fig. 21 is a device for producing shock waves in vacuum pipes. 400 is a cylinder, the lower part of which is in relation with the vacuum pipe 401, insulated by a cock 415 by means of a lateral tubulure 402, normally closed by a slide valve 403 solid with a block or piston 404, controlled by a spring 405, the resistance of which is determined for allowing the slide valve to play only above a given pressure, which is maintained while travelling in the part 400' of the shock cylinder.

The compressor piston 406 is arranged at a variable height in the cylinder 400, according to the desired effects, or maintained at 407 and provided with a shock damper 408 of variable height, so as to be more or less violently displaced by the propulsion action caused by the falling of a weight 409, conveniently guided.

A sudden compression will overcome the resistance of the spring 405 as soon as the compressor piston 406 has made a conveniently calculated course. The beds of rarefied air of the pipe 401 will then receive a violent propulsion wave which will directly actuate, at the rear part of the train any apparatus of intercommunication or of braking by admission of air (removable rear valve, etc.). The said cylinder may be brought, either at the same time or not, with a highly compressed air tank through any member such as the cock 412.

Fig. 22 shows a vacuum indicator, the small index of which $y$ shows the vacuum in the tanks, and the great index $z$ shows that of the general pipe and of the lower chamber of the cylinder, the difference between both numbers giving the effective braking power that is to say "by differential action" in the type of brakes with two chambers of Fig. 24.

The rear carriage then has a removable valve, but it has been foreseen a waves compressor cylinder according to Fig. 21 for hastening the tightening, and if necessary also that of the vacuum tank of 650 mm. interposed between the main pipe and the ejector as well as on the rear carriage for hastening the untightening in case of urgence, by the play of the vacuum apparatus combined for that purpose. They may operate with a cylinder such as that of Fig. 23 which comprises a piston with rolling ring.

Fig. 24 shows, as a modification, a vacuum brake with two chambers, the distributing valve 500 of which is solid with the diaphragms chamber, in order to avoid any vacuum losses. The diaphragm 501, made of strong rubbered fabric, secures a better tightening than that of other closures with rolling ring, especially in hot countries. The weight and cost of apparatus are reduced.

There is used a distributing valve, the simple play of a shock rod 502 allowing the same to be controlled from either side of the carriage by means of a chain $t$ and $t'$, and a drawing rod X securing the untightening of the brake through the valve 500. An auxiliary tank RR, a cock M' and, for long trains a tightening accelerator AS are provided. The distributing valve 50 may operate with any system of vacuum brake for replacing the similar parts.

At the tightening of the brakes, the valve 500 being open, the air is rarefied:

1. Under the diaphragm (or piston) by the canal 504.
2. Above the same piston by the canal 505.
3. In the tank RR' by the pipe 506.

At the tightening, the valve being applied by the air pressure, the vacuum is destroyed only under the piston, that is to say in the lower tight chamber 507.

In Fig. 25, the shoes levers are controlled only by the lever 7 which receives the whole stress of the constant and centrifugal braking. The other members of the said systems are in fact the following: an accelerator A, a quickly acting valve, a regulator M which is solid with the insulating cock R, a controlling or rectifier indicator I, and all members or parts pertaining to the self governor 1.

Fig. 26 shows a distributor combined for an air brake with only one chamber, which may be moderated both at the braking and at unbraking, and fulfills at the same time the function of depression accelerator, supply moderator, and of distributor, suppressing all irregularities coming from the variable resistances and of the delicate operation of slide valves. The distributor and supply regulator operate for themselves. The figure shows the parts after the loading of the main pipe. The pressure lowers the differential piston X—X, which thus brings:

1. The cylinder 707 into communication with the atmosphere by the valve 705 (spring 706).
2. The main pipe C into communication with the auxiliary tank A by the chamber B 703.
3. The chamber B into communication with the brake cylinder 707 by the chamber D of the diaphragms (pipe 707').

This movable system is brought towards the top only for a value of depression regulated by the spring 715. As soon as this movement begins, the reaction of the spring 706 applies the valve 705, the valve 704 remaining upon its seat $a'$ as long as the cone 704' has not yet abutted against the chamber 709, provided between pistons for enabling the operation of the escape valve 705.

At that time, the valve 702, insulating the tank R from the main pipe the chamber D and the cylinder 707 receive the air from the tank, but with a very reduced supply after the first application of the shoes, owing to the automatic closing of the cone 704', the grooves of which allow the maximum pressure to be obtained only in the front carriages.

The operation of the distributor is besides regulated by the ball 715 for the pressure and by the valve 717 in the sudden depressions, the excess of pressure allowing the arrival of air to take place into the front brakes only through the small canals 718. As soon as the pressures are balanced, the valve 702 reestablishes the communication. For a graduated untightening, the movable system is caused to be lowered, and the air of the cylinder is exhausted by the meeting of the large piston X with the tail of the valve 705, and the pressure, becoming preponderating at B, closes the chamber D by means of the valve 704, which progressively loads again the tank R. The brakes being completely untightened, the parts resume the position of Fig. 26. It is then absolutely possible to moderate as well the untightening as the tightening.

The piston X carries a valve 710 which opens as soon as it meets with the upper part of the distributor owing to a high depression. The spring 711 prevents any action at untightening or for the weak depressions the diameter and length of tail of the said valve allow the said valve to open before the valve 704 when a sudden depression occurs, which makes the chamber D communicate with the tank R and allows a supply greater than that of valve 704, which procures an economy of air, and an acceleration in the main pipe, owing to the expansion in the cylinder.

In Fig. 27, the braking stress is regulated by variations of the expansion from the tank 901, owing to a piston 902, brought back by a spring 903 for obtaining the maximum volume (carriage with its full load), an action which is counteracted by the raising of the frame 904 (cable 905, pulley 906 or axis of lever 908, fixed to the frame, connection of the system with the axle box 907, etc.).

The shoes may be applied by the action of a cylinder placed either inside, or outside the great cylinder 925 of Fig. 28, the distributor 920 being first in relation only with the small cylinder 921 through the pipe 977′ and the air of the tank 922 expanding into the reduced chamber 923 of the cylinder 925 only when the piston 928 of the cylinder 921 passes the orifice 927, after having applied the shoes against the tyres, that is to say without any important expense of fluid.

In Figs. 29, 30, 31, 32, the rotation of the loose pulley 951 transmits its centrifugal clutching strain to the shoes levers by means of a winch 934 controlled by the masses of the pulley 959 keyed on the same shaft 953, which freely surrounds the loose pulley 951. The controlling chain 955 rolls itself upon the winch for controlling the lever 7, together with the piston 956: the operation of the brake is similar to the preceding ones, the winch acting for any direction of rotation of the axle.

In Figs. 29 and 31, the controlling part is shown as being a chain 955 which acts upon the rings 970, 970′, the regulating arrangements of the apparatus being those of Fig. 6.

Fig. 30 is a combination of the apparatus of Fig. 29 with two independent controlling members acting upon the controlling levers (multiplying lever 7, etc.) and two groups of independent members, one 959 solid with the axle in order to bring the carriage to rest, or for causing, while travelling, a constant strain which is reduced to 0.40 or 0.50 of P, that is to say not jamming the wheels. The other part is formed by a loose winch 951 (Fig. 29) which operates on the contrary only through any centrifugal members (masses 97, etc.).

Both actuating members (pulleys, etc.) are independent from each other, but are arranged side by side so as to be clutched simultaneously and, generally speaking, so that the strain exerted upon the member rendered solid with the rotating part (constant strain) should be only a part of the whole braking which is sought.

It is possible to separate both groups of members controlling the constant and the centrifugal braking or the controlling parts, the braking by centrifugal action may then operate separately.

Fig. 32 shows a modification of the regulating winch which gives the constant and centrifugal effects by means of an only winch 1000 arranged so as not to bring the rotating part to rest, at the time of the application of the braking shoes. For that purpose, a cone 1001, keyed on the rotating shaft 953 is applied in the conical part 1002 of the said winch by means of a determined strain, thus giving a constant effort (0.50 P for instance). The shaft 953 of the said cone, keyed at E (Fig. 33) carries a wheel for receiving its power 1004 which is connected with the axle by means of any rods 958, rings 970, 970′, keyed chains 950ᵃ which act upon the supporting branches 950, 950′ of the shaft 953, either by the aid of a member such as 3 (Figs. 34, 35, 36) with or without fixation to the frame.

With the said rotating parts are secured controlling organs (walls 1006, etc.) of centrifugal organs, such as masses 976, which bring with them the loose pulley 951, the effort of which is added to that of the regulated spring 1003 in order to increase the action of the connected cone by any means or part interposed, such as part 1007 which is secured to the loose pulley, which repulses the cone 1001 towards the right by any convenient means, the said arrangement being provided so that the said action of supplementary connection may exert itself upon the cone 1001 whatever the direction of the travelling of the carriage may be.

The nut 1008 which regulates the length of the spring 1003 carries an index 1009 which is arranged in front of a graduation 1010 provided upon the neighbour branch 950.

In Fig. 32, the winch and cable 253 are controlled, either directly or not by the pulley 958 in mesh with the axle, for instance by means of toothed gears, without use of the loose pulley, which may be rendered solid either temporarily or not, with the winch, or by any connecting cones or by Hele Shaw clutches (not shown) without departing from the principle of the invention, which comprise all the means of utilization of the living force of the rotating masses, as a supplementary strain for the braking, the compression of air into the cylinders or in the tank being also foreseen, as well as a combination of complementary electrical action by means of a dynamo-electric machine, which may be controlled by the axle, and, consequently will cease its action at the time of jamming.

In Fig. 37, the apparatus is controlled by an auxiliary cylinder $C^4$ which is fed at $a^2$ only when the piston of the large cylinder $C^2$ gave a determined effort, and followed an undetermined way. Such complementary action is regulated by any convenient means.

The improvement shown by Fig. 38 consists in replacing or ending the rod 4 by a chain 4′ carrying the regulating head 18 which passes upon a pulley $P^2$ carried by the beam 5 and is fixed at the end of an auxiliary multiplying lever AB. A slide allows a bent connecting rod $O^2$ fixed to the beam 5 to take the normal position, at the time of the complete application of the blocks, thus providing for a larger multiplication of efforts owing to the said complementary action. In the said Fig. 38, the braking is shown effected by the only action of the self governor, the constant strain being obtained, at low speeds by the fixed part of the drum (Figs. 6 and 30).

Fig. 39 shows another arrangement of the lever 7 according to Figs. 1 to 3, which results in a great multiplication or amplification, the fork 5' of the lever 5 being normally controlled by the chain 4, the head of which 18 is guided by a pulley 206, its spindle rolls upon an angle iron 301 arranged in a vertical plan, parallel to the axis of the frame.

The lever 7 controls the chain by means of any member 201, taken with the displacement of the head 18, either by the continuous action exerted by the cable 19 which is used for the control mentioned with Fig. 7, whose rules are the same, either for the hand traction or by the winch; for bringing one of the links 6 into the fork of the lever 5, thus securing by the rollers 302, 302' the raising lever 303 controlled by the rod 304 at the time of the initial regulating. The dead weight of the lever 7 is balanced by the counterweight 305 which, at the end of the tightening brings back all the said parts.

In Figs. 40 and 41, the chain is fixed at 5' and displaces itself in the holes 308 of a pulley 309, which is maintained in a slide 7' of the lever 7 by the spindle 300 and by the abutment 311. A chain 313 is attached to a hand wheel 314 keyed on the spindle 300 of the lever 7, which permits the manœuvre of untightening and the rotation of the pulley 309 with the control of the regulating device of Fig. 7. It is also possible to horizontally arrange the lever 7 by placing the strap of the pulley 212 in a vertical direction (Figs. 42, 43). In such conditions, it is the part 204 which is displaced upon the lever 7 by means of an endless chain 200, which passes upon the pulleys 201 and 203, fixed upon the lever 7. The said chain is connected with a binding ring 203' in which passes the link 204 which takes the lever 7, and upon which are fixed the rod 211 and the chain 205, conveniently guided between the rollers 203, 206', for taking the lever 5 controlling the shoes levers. A cable 19 (Figs. 44, 45) fixed to the said link 204 is provided with an index 23' and constantly put under tension by a spring 208, which displaces the same in front of a graduation 209 arranged upon the frame, according to the load (Fig. 45). The lever 7 is controlled by the chain 255 fixed to the winch 954. A circular cylinder C, C' (Fig. 61) carries the lever and the winch 11 in their normal displacements.

Figs. 34, 35, 36 show a modification with a self regulator winch 25, fixed upon the frame and controlled by means of an intermediary part 3 (toothed wheel) hanging by means of the weight 16 to the shaft 5 of the winch, which, at the time of the braking, is thus connected by the cable c with a wheel 2 keyed on the axle, a connection which could also be made by means of the toothed wheels of Fig. 64. The said wheel 3 is thus strongly jammed between the surfaces or toothed parts 2 of the said wheel and that of the small pinion 4 keyed on the shaft 6 of the winch, which is directly put into quick rotation. The chain 11 of the winch passes upon a pulley 12, the spindle of which slides in a guide 17 in front of the load indications of a graduation 18. The chain 11 is fixed at the corresponding point marked on the lever 7 (at 13 or 14 for instance).

The connecting rod 15 thus acts upon the branch 23 of the lever 3 at the rate of 50% P for instance, by the piston of the cylinder 28 (or by that of any brake in service) the connecting rod 19 connects the apparatus 25 with an effort determined by the spring R or by any other means intending to distribute the efforts, so as to correct any mistake of regulation.

In Fig. 36, the general arrangement is the same, but the multiplying lever 7 is directly keyed upon the shaft of the lever 1; the hook 31 engaged into a hole 33 maintains unmovable the sleeve 3 in the manœuvres of the carriage.

Figs. 46 and 47 show a winch 100, a controlling member 103 connected to the piston of a fluid pressure cylinder, (or electric or a hand mechanism) a pulley 104, a regulating pulley such as 105 or any other already described and moreover an elastic or not elastic jamming member (chain 14 or other) which permits not to exceed a maximum constant effort, of 50% P for instance.

In Fig. 48, the lever 7 is brought from bottom to top by an abutment 94 mounted upon the pulley 96 (direction of rotation $fe$) but, upon the said lever 7 acts a second lever 7' which may raise the said lever 7 when itself is forced from bottom to top by the abutment 94 (direction of rotation $fb$). It is automatically, and by the only initial of the system of levers through the cylinder that the ends $7^a$, $7^{a'}$ are brought tangentially in contact with the common abutment 94 for being maintained fixed by the loose pulley 96, taken with at variable degrees by the rotating masses 95.

Figs. 49, 50 and 51 indicate an example of application of the invention to the motor cars. The loose pulley $105^b$ of the apparatus carries a controlling pin 300 which acts against the roller 301 of a lever 302 pivoted at 303 connected by the lever 304, and unconnected by the spring 305, but embraced by a lever 302, 305, which pivots at 2'. 312 and the other branch of winch 307 acts upon a convenient member (rod 308 or other)

which controls the brake 311, preferably through the aid of a spring or other resilient device, lever or cam 308ª.

Owing to the releasing spring 305, the connection between the parts 300 and 301 is made only through a traction upon the lever 304 by means of the rod 309 connected with the pedal. The complementary braking effort thus brought then varies with the controlling force of the pin 300, that is to say according to the speed and the jamming of the wheels, cannot be determined but by a direct or independent action of the pedal and by surpassing if necessary a given effort. The said arrangement acts in both directions (for instance for motor cars).

Fig. 49 indicates in dotted lines only diagrammatical arrangements which allow by means of a rod 310 to first apply against the loose pulley 105 a friction shoe or cone 311 which delays or stops the movement of the same with a braking action which is lessened with the speed. It is posible, however, to obtain the said complementary braking by any other means.

The arrangement of Fig. 52 reinforces the action of any hand brake by a self decreasing action given by the apparatus described with an additional connecting rod 12$^m$ connected with the system of levers 2$^m$ by means of an impulsing member 3$^m$ which may be maintained at 3$^{m'}$ temporarily disconnected from the controlling fork 8$^m$ keyed on the shaft 9$^m$ which itself is controlled by the amplifying lever 7$^m$, for instance by means of a lever or chain 4$^m$ the link 5$^m$ of which is engaged into a piston 6$^m$, and which a part 6$^m$ disengages for the tightening for automatically reestablishing the normal impulsing between 3$^m$ and 8$^m$. The complementary impulse is transmitted to the part 8$^m$ by any convenient means, for instance by lowering the lever 7$^m$ by means of the traction or of the vertical push of the pivoted lever 10$^m$ according to the direction of the rotation by the action of a part 11$^m$ of the loose pulley 105 of the apparatus, which is keyed upon the axle (pin 11$^m$).

The lever is connected with the pin only by the coiled spring R$^m$ carried by the rod 13$^m$ of the ordinary screw brake controlled by the ordinary means (by means of a hand wheel, etc.).

Fig. 53 shows the already indicated arrangements in Fig. 7 which may previously regulate, in the said special arrangement, the efforts according to the load, the roller 19$^m$ of the strap 12$^m$ may also be completely disengaged from the driving fork 8$^m$, for the moderate brakings, that is to say by displacing towards the left the arrow of the controlling dial 19$^m$. The levers 10 of all the carriages of a long train could be connected with one another so as to reinforce the braking action in the slopes by a simultaneous controlling. It is also posible to apply, for the hand braking, all other arrangements already described, in combination or not with those of Figs. 70, 71.

Fig. 54 diagrammatically indicates means for keying the loose pulley 105 of the self governor so that the same thus forms a friction shoe against the rotating masses. The putting in action of such brake is obtained by a strut 1$^k$, pivoted at 2$^k$ to the frame, the same being released at the time of braking for being brought into contact with the loose pulley 105 which stops a pin 3$^k$ of convenient shape that the rotation of the pulley may be stopped. A cable 4$^k$ raises the strut and makes the braking cease.

Fig. 33 shows an arrangement of the said devices actuated either by a continuous (not shown) or with any convenient means of direct hand control used (unified material or any other) or by means of transmissions of half continuous efforts already described or known (chain, etc.). The gearing by means of toothed wheels will be convenient for large carriages, the constant effort being then reduced for instance to 0.30 of P in view of the moderate efforts of braking, and the value of the centrifugal effort being then increased if necessary.

The figure shows in dotted lines that the connection of the apparatus may be made by any arrangement, either through the control so called "hooked" or by means of two hand levers 1, 1' fixed on either side of the carriage at both ends of the controlling shaft $a$ with any connecting members, by ratchet with escapement controlled by counter weight, springs, etc. On another hand, the amplifying lever 7 will be possibly controlled either by the regulation connecting rod 4, with a movable regulating strap 18, or by a single drawing connecting rod, pivoted upon the said lever for the carriages with slow load variations.

At last the same apparatus may receive the continuous control by means of a cylinder which is very reduced C$a$ (shown in dash and dot lines) which will engage only the connecting rod B for taking with either the intermediary wheel 3, or directly the pulley 1004 which any rod or chain 958 may connect with the pulley 2. The spring $r$ which damps the connection by toothed wheels, is then withdrawn in order to permit any action of moderability by the fluid action or by the manœuvre of the escaping lever shown in Fig. 33ª. The lever is keyed upon the shaft of the wheel V the effort of which is limited by that which, in case of very bad adherence, would jam the empty carriage. Figures 1, 2, 3, etc., are marked upon the said levers in order to enable to apply any service instructions relating to the circumstances of the train (adherence, modification of load, etc.). The braker is compelled, accordingly, at the time of the complementary effort, of the braking to be obtained, to place the index with his right hand upon the figure indicated by the instructions on giving his maximum effort.

Any other correcting index, as well as any arrangement capable of facilitating the said regulation of the so called "constant braking" may be provided, the centrifugal action of the apparatus giving any other regulations with an automatic reduction of the efforts in excess and other determining causes of the jamming. It is possible for instance to use a regulating chain 1030 (Fig. 55) fixed to the counterweight at 1031 and which passes upon regulating ratchet drum 1032 arranged in front of a dial.

The counterweight 1027 unrolls at the end of its stroke a coiled spring R of a given quantity R', corresponding to the actual load. The length of the chain 1030 is regulated, by hand or automatically by means of an index brought into coincidence with a figure (bringing for instance a flag in view) Fig. 56. The said weight and the regulating lever 7 may be quickly brought back to the position of unbraking by the simple aid of a spring wheel or any lever actuated on either side of the carriage.

In Fig. 55, the said connection is made without any shock by the spring 1033 compressed by the cam 1034 of the weight. Owing to the weak effort necessary for that instantaneous action of the brake and to the uniformity of action of the brakes the jamming of which is automatically avoided in any circumstance, a group of carriages, connected or not to a locomotive may be braked at any time.

For the carriages which are already provided with releasing brakes, there will be provided in place of the weight 1037, the quick controlling members of the several systems. For that purpose, the controlling levers of those brakes the parts 1021' and 1022' which control the Hallot self regulator, as well as the chain 1030 for the antagonist reaction which regulates the load.

Fig. 57 shows diagrammatically the adaptation of the said controlling means to a brake of the model Lapeyrie.

Fig. 58 shows another arrangement for any screw brake with a direct actuating means used in the several European States.

Figs. 57, 58, 59, 60 show diagrammatically examples of arrangements for connecting the controlling means of several brakes in use with the self regulating and complementary action of apparatus Hallot in a first series of improvements, and then, later on, with the use of the continuous control (part shown in dotted lines in D$a$ for Figs. 57 and 58, and in D$b$ for Figs. 59 and 60). In such occurrence, any arrangement is provided for enabling the action of the hand brake (chain such as 1036, slides 1037 and 1038) an arrangement which will permit the application of the continuous control with the use of improved means, first controlled by hand, and, consequently a distribution of the expense upon several years.

Fig. 62 shows an arrangement of continuous brake comprising the parts already described, but arranged in a somewhat different way: a very small cylinder C giving only a constant effort equal to or less than 0.30 or 0.40 P and a self regulating winch 3 which gives, independently, but however according to the variable load, a complementary effort, the sum of both efforts being arranged so as to never exceed 0.40 or 0.50 of P in order to avoid the jamming of wheels in any circumstance.

The system of levers is controlled by the rod $c$ of the air cylinder piston C which actuates the lever T controlling the shoes, and, simultaneously displaces the clutching rod G of the self regulating winch 3 by the aid of a spring 50. The latter compensates the wear of the shoes and the clearances of the system of levers, owing to the fact that the variable degrees of its compression always remedies the corresponding value of the expansion caused by a greater stroke of the piston in case of a bad regulating of the shoes.

The winch 3 comprises a return pulley $r$ leading the chain M, fixed to the amplifying lever 7, pivoted at $a$, in points variable according to the load, owing to the convenient positions given to the movable head $d$ of the chain M in proportion to the load. The lever 7 actuates the controlling lever T through a connecting rod K, the position of which is determined by a pin located in one of the holes $t$. The regulation is obtained by any described means, or by the hand wheel 22 (Fig. 63) the arrows of which 23, 33' have to be brought into coincidence and which are displaced by the chains 19 and 21, and the positions of which depend on the position of the head $d$ and on the intensity of the load.

Figs. 64 and 65 show details of the winch 3, which has two oil cups $x$ $x'$ and an amplifying blade $w$ arranged between the masses and the periphery of the winch, which arrangement, more particularly destined to passenger carriages, enable the coefficient of braking of speedy trains to be greatly increased, by exerting upon the shoes an effect which may attain 1.80 P and even 2.10 P. For that purpose, upon the axle is provided a connecting sleeve 2" (Fig. 71) with a large diameter and with removable friction surfaces 2', the said sleeve 2" being formed of two parts, for instance of pig iron, connected together by bolts 10 in the radial branches 11, so as to enable a quick replacing of the same, keys 12, 12' being provided for rendering the mounting easy.

It is possible, while all the trains are not yet provided with the powerful brakes described, to brake the same with a great power by using the existing devices with the following arrangement, described in Figs. 66, 67 and 68, which are a complement of those already described.

In Fig. 66, one of the shoes Sa of the carriage is provided with a double head 1, carrying at its end the roller 2 of a winch 3 upon which is fixed the end of a cable or chain 4, connected with a member for the distribution or exhaust of air of a type which varies according to the type of brake.

The winch 3 rests upon the wheel tyre, when the shoe Sa which carries the said winch is applied against the wheel. A strong regulating screw V regulates its position relatively to the tyre, but when the shoe is worn the head 1 is simply arranged so that it may be displaced round the pin o of the necessary quantity, an abutment y for instance of india rubber being provided. When braking, the roller of the winch is brought into contact with the tyre of the wheel thus cocking by the cable 4 a releasable member, the releasing of which will act upon an air distributing or exhaust member when, the wheel becoming jammed, the roller 2 of the winch 3 will no longer be rotated.

The arrangements providing for the exhaust of air from the cylinder C' of the compressed air brakes, or the closing of stopping valves may vary according to the type of brake used, such as the valves S and W (Figs. 67 and 68).

In Fig. 67, the valve is put in action by the fall of a mass F', the living force is calculated so that may open the valve, though its weight is not sufficient for opening the said valve. In Fig. 68, the cock W is provided with a closing spring and with an abutment which determines its position of opening when the winch is put into action.

Those means of reduction of pressure may be combined together in order that in the period of filling up the air cylinder (or the exhaust of air through the double valve) in case of two chamber brakes the stopping cock W in relation with the tank such as R for the two chamber brakes or a cock not shown in communication with the atmosphere act together with the automatic exhaust valve of Fig. 67.

By the reduction of pressure thus determined in the cylinder C, the braking effort is then parallelly reduced, and the wheel is directly put again in motion, while the exhaust members (or cocks) resume their normal positions. In spite of that first regulation, and owing to the increase of the friction coefficient of the shoes, a new jamming will soon anew take place, namely in case of a tightening by a braking of the connections between two carriages or by a bad adherence, but the same effect will oppose the jamming.

For the traveller carriages, a small winch 3 may be arranged, similar to that shown in Fig. 64, should it be desired that the exhaust of air be produced as soon as the wheel has only a reduced speed which is to be determined.

The same arrangements may be used with any other means for taking force from the rotating parts (axles or wheels) and by any other mechanical appropriate means, being understood that the same apparatus may operate in a similar way for the admission of air in the vacuum braking systems.

Other means consists in applying the winch either upon the tyre or upon the axle by displacing any other parts of the levers system, or even by the play of the piston itself in view of obtaining the same effects or any other effects for the same purpose by the only fact of the jamming of one or the other axle.

Figs. 69 and 70 show diagrammatically a simplified arrrangement which may be preferable for any ware carriage which differ from those shown in Fig. 2 only by the following arrangement: the piston P no longer directly controls the system of levers T and the effort of the motor fluid is used for bringing the pulley 959 into connection with the controlling sleeve 2' which controls the centrifugal masses 974 of the self regulator winch.

It is thus possible with a very reduced expense of fluid (compressed air or vacuum) to benefit with the very high amplification given by the proportion of the winch 3 and of the considerable amplification given in proportion of the load of the carriage.

The constant effort is given directly by the winch but, independently of the centrifugal action of the masses, that is to say by the force of application which they are receiving even at a very low speed by the action of strong coiled springs in a convenient number, such as 13 which are arranged in a corresponding recess of every mass 974 with an initial effort of compression conveniently determined, maintained by parts 978 or in any other way.

The operation is then the same as that already described owing to the said action of the springs 13 to which the centrifugal action is added when necessary, in proportion with the effort desired by the driver.

The winch may offer the arrangement after Fig. 73 in which the said winch 37 provided with a loose pulley may be brought in mesh with the sleeve 38 keyed on the axle 39, so as to control the operation of the shoes by means of another winch 41—42 provided with a cam intended to render the action of the said winch more powerful.

Instead of putting the rotating masses and the loose pulley in the part 37 as in Fig. 73, the said parts may be directly mounted into a pulley 37', as in Fig. 74.

The arrangement may be that of Figs. 75 and 76 in which a roller A' intending to be brought in friction engagement with the wheel B' of a carriage is keyed upon the shaft C' of a winch D' which may be brought into action by the rotating masses E' enclosed in a casing F'.

In that arrangement the reducing valve G' is provided with inlets H', I', J', which may bring the body of the said valve in communication respectively with the brake cylinder, the auxiliary tank and the atmosphere when sliding valves R', L' are respectively opened at the time of braking, that is to say when the corresponding shoe is brought in contact with its vehicle wheel. As it may be seen on that figure, this bringing in action of the said shoe causes the winch M' to rotate, thus pulling the cable N' connected with the bent lever O', P', Q' which then is brought into the position O", P', Q" as long as the carriage wheel B' is rotating. Should this wheel cease its rotation, the winch M' being no longer rotated, the spring R' acts and brings the lever into the position O', P', Q', thus causing the same to depress the valve G' thus bringing the cylinder in communication with the atmosphere.

As soon as the air exhaust, which then takes place, is sufficient for reducing the braking action, the wheel B' will resume its rotation, thus bringing back the lever into the position O", P', Q", thus allowing the valve G' to be closed by means of its spring.

What I claim is:

1. A braking device for vehicles comprising in combination a braking element adapted to be applied to a moving part of the vehicle for resisting movement of the vehicle wheels, means for applying the braking element, means cooperating with the applying means for reinforcing and rendering more uniform the action of the brakes and comprising a rotating means provided with centrifugally operated means, and means controlled by the centrifugal means for adding power to the first mentioned brake applying means, said brake applying means including a conduit, a fluid actuating means, a conduit connected with the fluid system, and means connected with the conduit adapted to be actuated by the fluid from said conduit and cooperating with the brake applying means to secure a simultaneous and instantaneous setting action of the brakes.

2. In a braking system for vehicles, the combination of a winch actuated by a moving part of the vehicle, a cable wound on said winch, shoes adapted to engage the wheels of the vehicle, means for actuating the shoes to braking position, and means interposed between the winch and cable and the operating means for the shoes whereby the winch will regulate the intensity of the action of the operating means, and a lever having a variable stroke for controlling the interposed means.

3. In a braking system for vehicles of the compressed air type, brake shoes and means operated by the compressed air system for throwing the brake, a compressed air tank, an air compressor carried by the vehicle axle for maintaining a high degree of air pressure in said tank, and means connecting the compressed air tank with the operating means for the brakes for causing a quick release of the braking shoes.

4. In a braking system for a plurality of connected vehicles, the combination of a plurality of brake shoes adapted to be applied to the vehicle wheels, an air compressor, a main compressed air pipe connected with the air compressor and means adapted to be operated by the air from the main pipe for throwing the brakes, and means cooperating with the air brake system for causing a rapid re-loading of the main supply pipe of the air brake system for hastening the tightening and releasing of the shoes of the vehicle at the end of the train, said first mentioned air braking system being provided with a triple-effect valve.

5. In a braking system for vehicles, the combination of brakes adapted to be applied by fluid pressure, a cylinder to receive the fluid pressure and a piston connected with the brakes and operable within the cylinder, a winch adapted to be moved into contact with the rotating element of the vehicle when applying the brakes, a cable connected with the winch, a fluid pressure regulating means adapted to be connected with the other free end of the cable, said pressure regulating means adapted to control the exhaust of the excess compressed air in the cylinder of the brake and likewise the admission of the fluid to said cylinder whereby a reduction of the braking effect is had when the wheel ceases to rotate due to jamming.

6. In a braking system for vehicles, the combination of brakes adapted to be applied by fluid pressure, a cylinder to receive the fluid pressure and a piston connected with the brakes and operable within the cylinder, a winch adapted to be moved into contact with the rotating element of the vehicle when applying the brakes, a cable connected with the winch, a fluid pressure regulating means adapted to be connected with the other free end of the cable, said pressure regulating means adapted to control the exhaust of the excess compressed air in the cylinder of the brake and likewise the admission of the fluid to said cylinder whereby a reduction of the braking effect is had when the wheel ceases to rotate due to jamming, a discharging valve arranged upon the compressed air cylinder, and a spring for automatically controlling the valve, said valve having connections with the cable and adapted to be maintained in open position during the movement of the cable actuated by the rotation of the winch.

In testimony I have hereunto set my hand at Paris, France, this 21st day of April, 1922.

PAUL HALLOT.